US011429076B2

(12) United States Patent
Brown et al.

(10) Patent No.: US 11,429,076 B2
(45) Date of Patent: Aug. 30, 2022

(54) AUTOMATIC STRATEGY DETERMINATION FOR COMPUTER AIDED MANUFACTURING

(71) Applicant: Plethora Corporation, San Francisco, CA (US)

(72) Inventors: William Haldean Brown, San Francisco, CA (US); Ruza Markov, San Francisco, CA (US); Michael Rivlin, San Francisco, CA (US); Ambrus Csaszar, San Francisco, CA (US); Jonathan Stults, San Francisco, CA (US)

(73) Assignee: CADDi Inc., Tokyo (JP)

( * ) Notice: Subject to any disclaimer, the term of this patent is extended or adjusted under 35 U.S.C. 154(b) by 145 days.

(21) Appl. No.: 17/061,895

(22) Filed: Oct. 2, 2020

(65) Prior Publication Data
US 2021/0018887 A1  Jan. 21, 2021

Related U.S. Application Data

(63) Continuation of application No. 15/846,818, filed on Dec. 19, 2017, now Pat. No. 10,838,387, which is a continuation of application No. 15/263,213, filed on Sep. 12, 2016, now Pat. No. 9,880,542.

(60) Provisional application No. 62/217,504, filed on Sep. 11, 2015.

(51) Int. Cl.
*G05B 19/042* (2006.01)
*G05B 19/408* (2006.01)
*G05B 19/29* (2006.01)

(52) U.S. Cl.
CPC ......... *G05B 19/0426* (2013.01); *G05B 19/29* (2013.01); *G05B 19/4086* (2013.01); *G05B 2219/13141* (2013.01); *G05B 2219/34093* (2013.01); *G05B 2219/36224* (2013.01); *Y02P 80/40* (2015.11)

(58) Field of Classification Search
CPC .......................... G05B 19/0426; G05B 19/29; G05B 19/4086; G05B 2219/13141; G05B 2219/34093; G05B 2219/36224; Y02P 80/40
See application file for complete search history.

(56) References Cited

U.S. PATENT DOCUMENTS

| 7,445,449 B2 | 11/2008 | Sager |
| 8,041,445 B2 | 10/2011 | Suh et al. |
| 8,244,386 B2 | 8/2012 | Gray |

(Continued)

FOREIGN PATENT DOCUMENTS

CA    2822563 A1    2/2015

OTHER PUBLICATIONS

"Muniappan, Vinodhkumar Somavar, Automatic Feature Recognition and Tool Path Generation Integrated with Process Planning, A thesis presented to the University of Waterloo, 2012, pp. 1-128. SRC".

*Primary Examiner* — Christopher E. Everett
(74) *Attorney, Agent, or Firm* — McDermott Will & Emery LLP

(57) ABSTRACT

A method for automated manufacturing strategy generation can include: identifying features of a desired part from a virtual model; and determining a tactic strategy based on the identified features. The method can additionally include: determining a toolpath primitive for each tactic; combining (Continued)

FIGURE 4 the toolpath primitives for the tactics to generate a master toolpath; and translating the master toolpath into machine code.

10 Claims, 8 Drawing Sheets

(56) References Cited

U.S. PATENT DOCUMENTS

| | | |
|---|---|---|
| 8,521,245 B2 | 8/2013 | Kuhn |
| 8,695,958 B2 | 4/2014 | Marrinan et al. |
| 8,725,283 B2 | 5/2014 | Gray et al. |
| 9,164,503 B2 | 10/2015 | Bolin et al. |
| 9,187,188 B2 | 11/2015 | Richter et al. |
| 9,292,626 B2 | 3/2016 | Nelaturi et al. |
| 9,465,380 B2 | 10/2016 | Barakchi Fard et al. |
| 9,618,926 B1 | 4/2017 | Louette et al. |
| 2006/0115794 A1 | 6/2006 | Sager |
| 2008/0058984 A1 | 3/2008 | Gray et al. |
| 2008/0281462 A1 | 11/2008 | Suh et al. |
| 2011/0087364 A1 | 4/2011 | Gray |
| 2011/0178619 A1 | 7/2011 | Jung et al. |
| 2011/0202319 A1 | 8/2011 | Weisz |
| 2014/0018953 A1 | 1/2014 | Bolin et al. |
| 2014/0163720 A1 | 6/2014 | Nelaturi et al. |
| 2015/0012171 A1 | 1/2015 | Richter et al. |
| 2015/0039122 A1 | 2/2015 | Barakchi Fard et al. |
| 2015/0056037 A1 | 2/2015 | Wilson |
| 2015/0212516 A1 | 7/2015 | De Schepper |

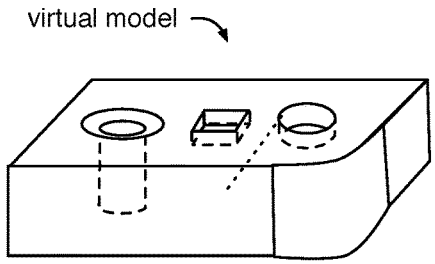
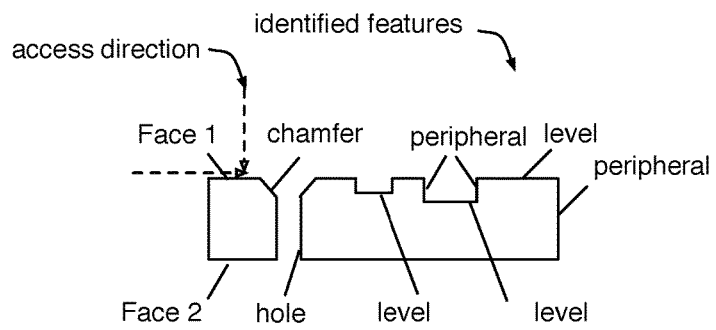
FIGURE 5A  FIGURE 5B
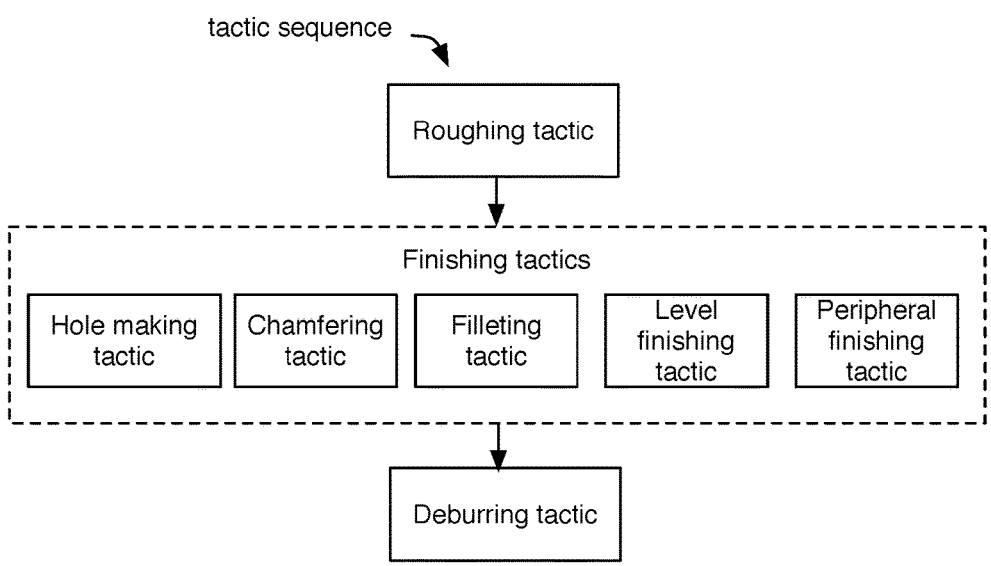
FIGURE 6
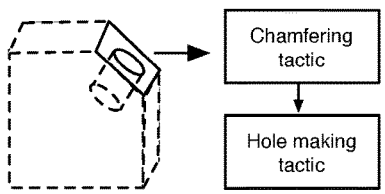 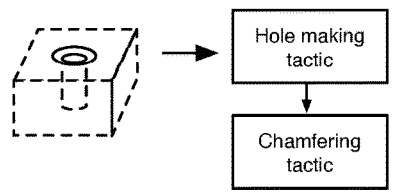
FIGURE 7  FIGURE 8

AUTOMATIC STRATEGY DETERMINATION FOR COMPUTER AIDED MANUFACTURING

CROSS-REFERENCE TO RELATED APPLICATIONS

This application is a continuation of U.S. application Ser. No. 15/846,818 filed 19 Dec. 2017 which is a continuation of U.S. application Ser. No. 15/263,213, filed 12 Sep. 2016, which claims priority to U.S. Application No. 62/217,504 filed 11 Sep. 2015, both of which are incorporated in their entirety by this reference.

TECHNICAL FIELD

This invention relates generally to the automated manufacturing field, and more specifically to a new and useful system and method for automated strategy and stage determination for computer-aided manufacturing in the automated manufacturing field.

BACKGROUND

Automatic manufacturing strategy determination for a part can be desirable when fully automating part manufacture. However, automatically determining the manufacturing strategy cannot be accomplished by simply automating a previously manual process. This is because conventionally, the manufacturing strategy (including the selection and order of machine use, the feature manufacturing order, the toolpath determination, and other strategy parameters) is uniquely created by an experienced machinist for each part to be manufactured. The guidelines used by individual machinists not only vary across machinists, but also cannot be applied globally to a majority of part manufacture. Furthermore, these guidelines are not amenable to optimization for a manufacturing parameter, such as time (e.g., machine run time, time to delivery, etc.), cost, or material use. Thus, there is a need in the automated manufacturing field to create a new and useful system and method for automated manufacturing strategy determination. This invention provides such improved/new and useful system and method.

Additionally, conventionally, the user operating the machine is the one who programmed the machine. This user therefore has an inherent understanding of the intended process, and can immediately identify errors in the machining process, such as whether the part is arranged in its intended orientation, whether the intended toolpath has been executed, or whether a software update to the machine has changed how the machine is interpreting the machine code. In contrast, when part manufacture is fully automated, the operator is no longer the machine programmer, particularly in instances where the machine program is automatically generated. This disconnect leads to a feedback void—the operator is no longer capable of identifying if and when things go wrong. This problem is further compounded when different machines are used interchangeably, because different machines interpret the same code differently. Thus, there is a need in the automated manufacturing field to create a new and useful system and method of reducing or eliminating manufacturing errors, and a new and useful system and method of enabling interchangeable machine use. This invention provides such improved/new and useful system and method.

FIGURE SA is an example of a virtual model of a desired part.

FIG. 5B is a cross section of the example in FIGURE SA, with the features identified.

FIG. 6 is a flowchart representation of an example sequence of tactics to be applied to virtual model features.

FIGS. 7 and 8 are examples of tactic dependency determination based on predetermined inter-feature interaction patterns.

Figure 9:
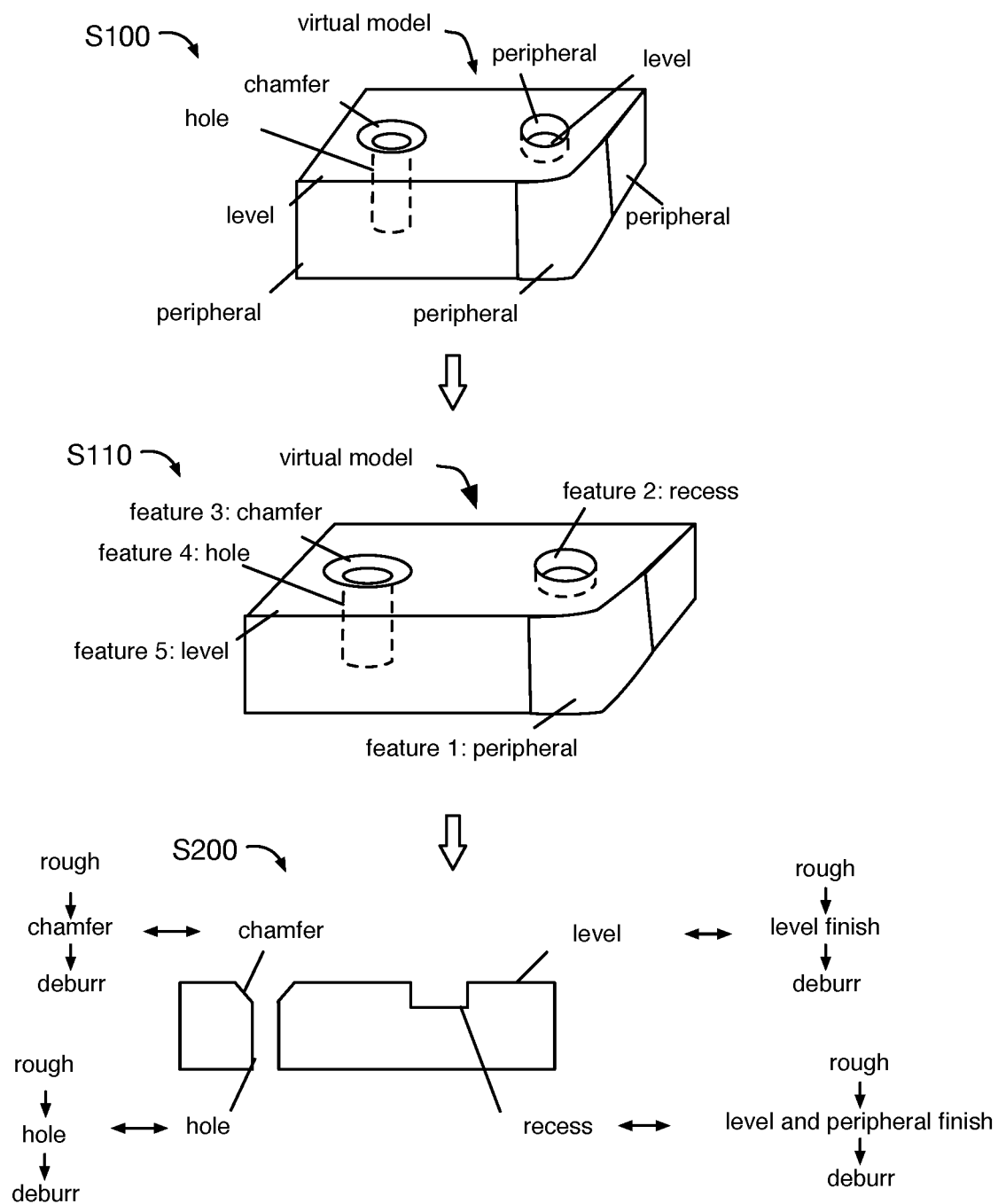

FIG. 9 is an example of ordered tactic series determination for each identified feature of a virtual model.

Figure 10:
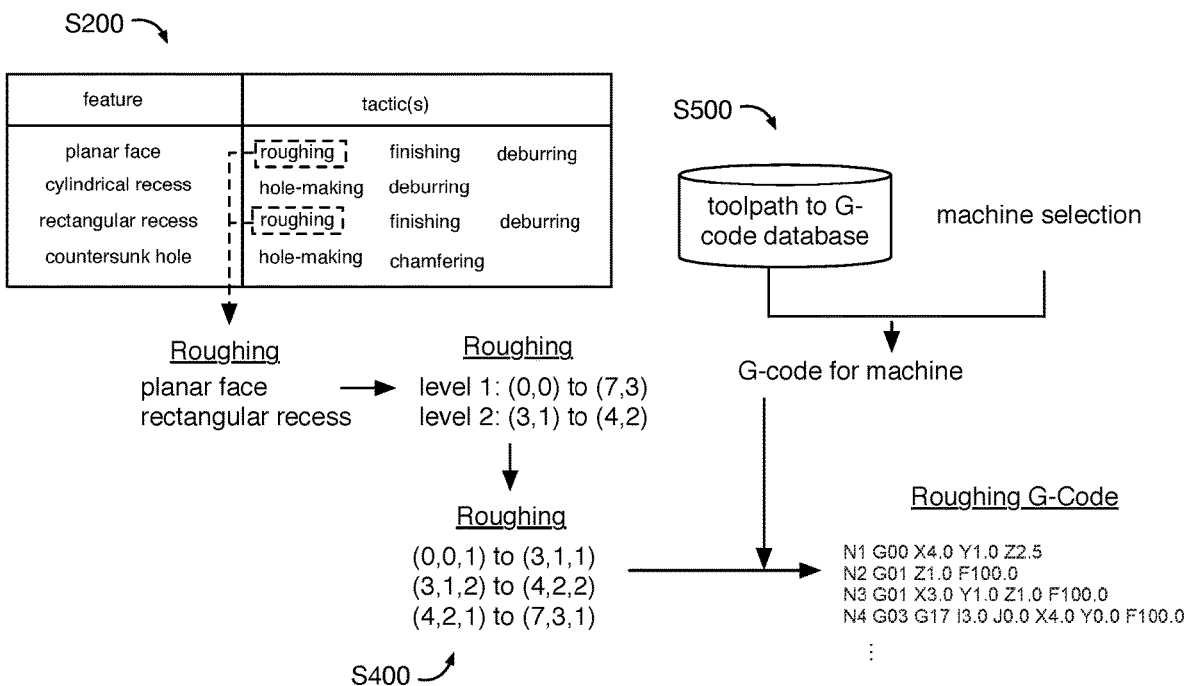

FIG. 10 is an example of generating toolpaths for the face based on the tactics; and generating machine code based on the toolpaths.

Figure 11:
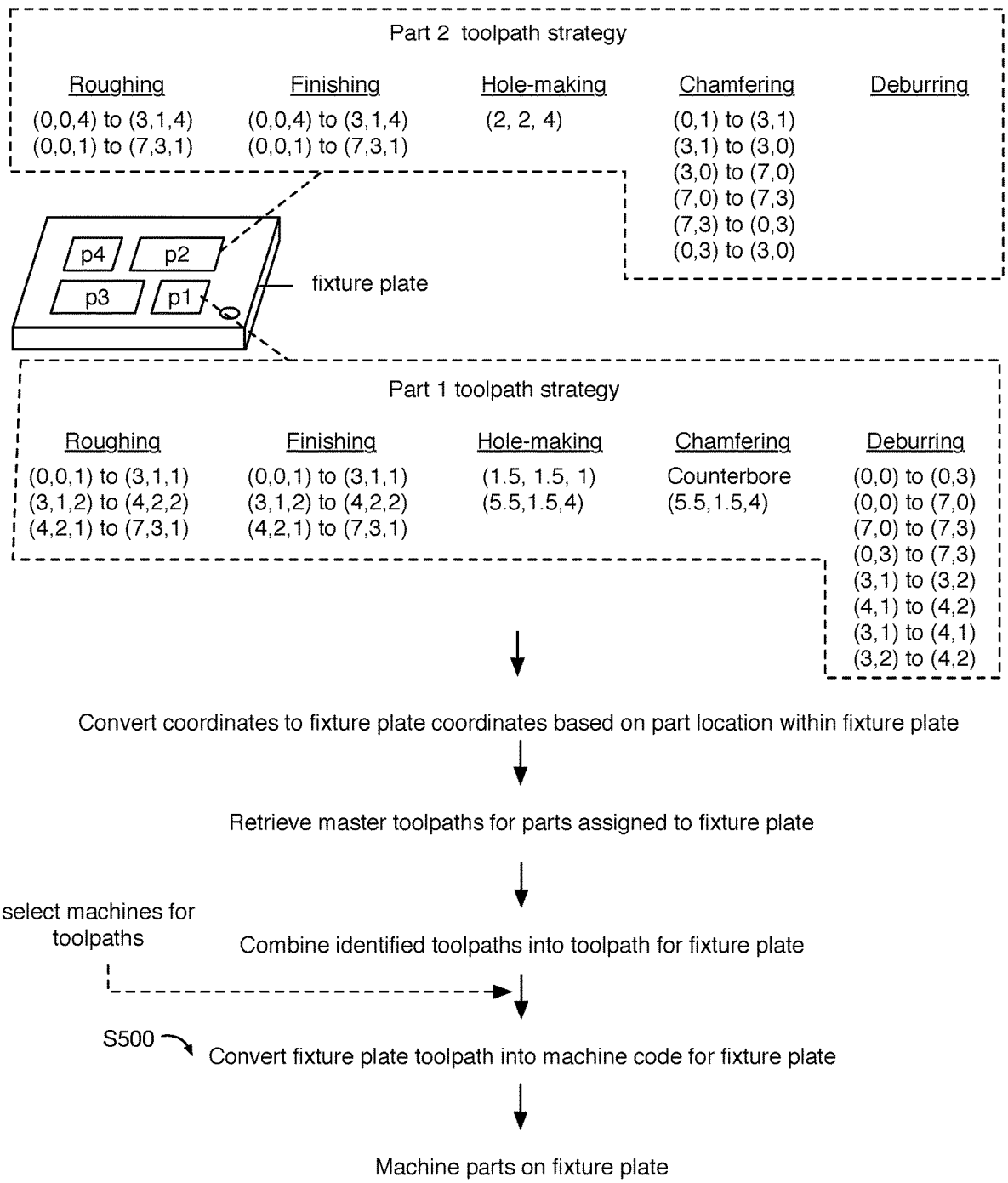

FIG. 11 is an example of generating toolpaths for multiple parts on a fixture plate.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
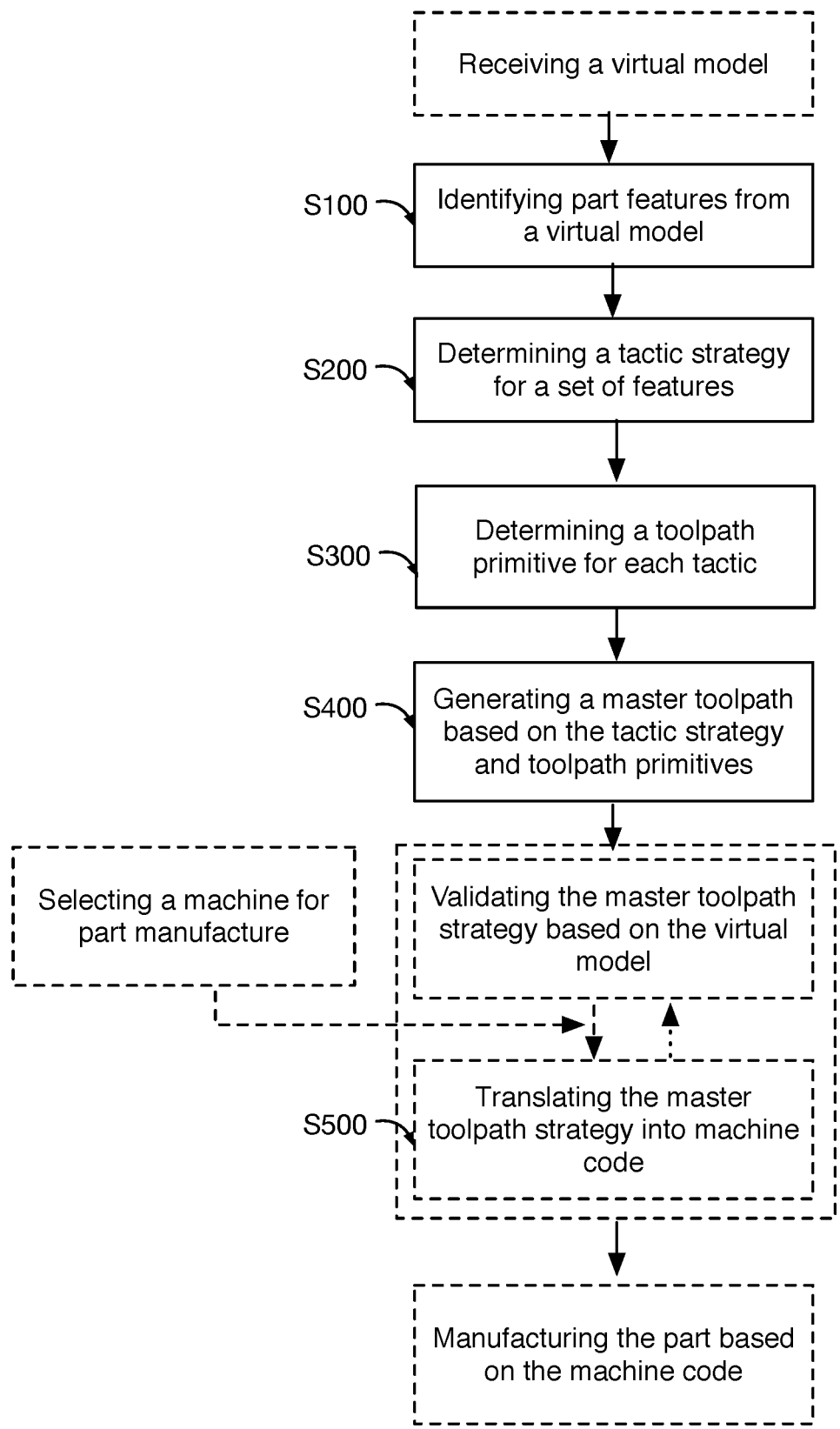
FIG. 1 is a schematic representation of the method.
Figure 2:
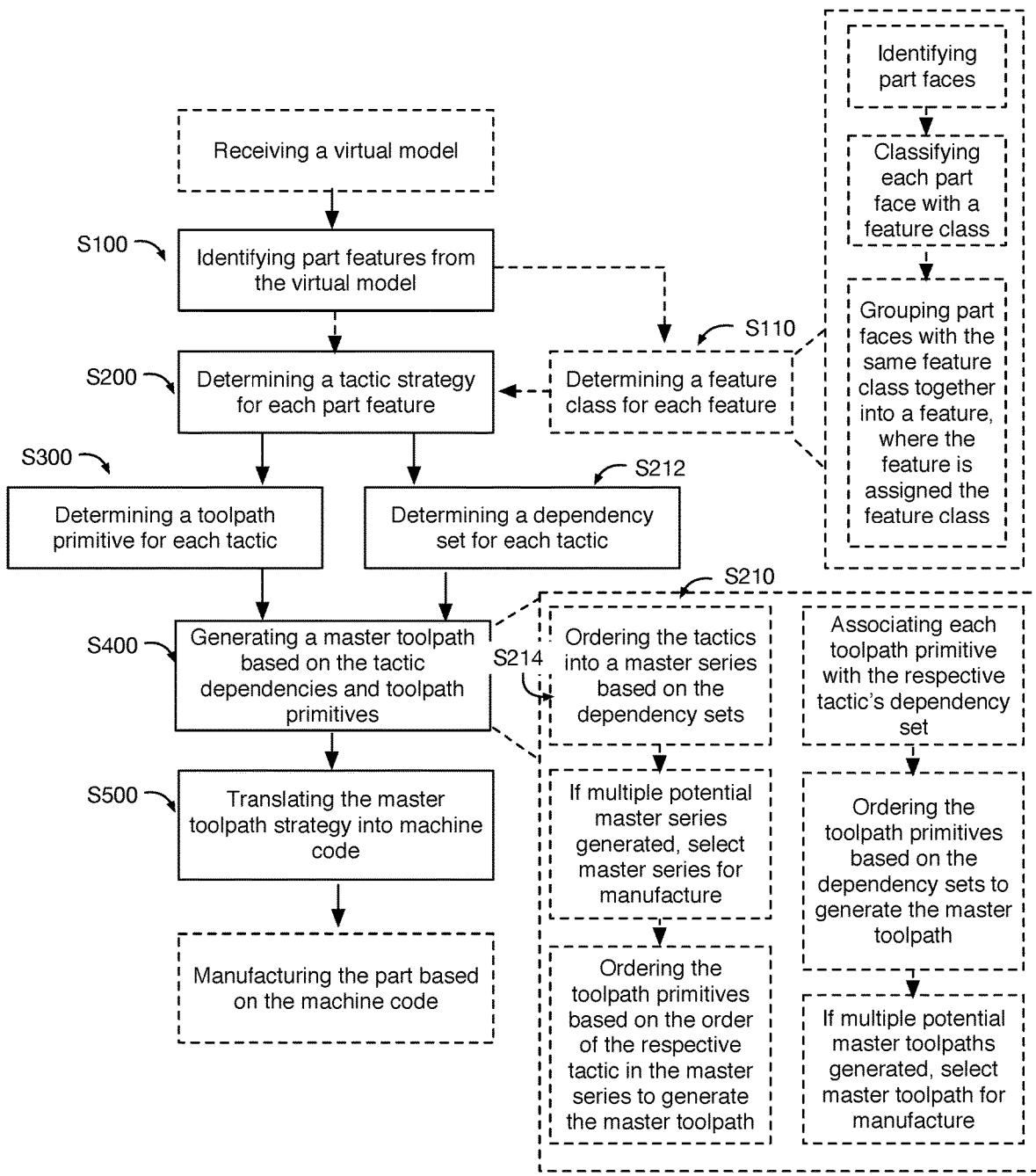
FIG. 2 is a schematic representation of a variation of the method.

As shown in FIG. 1, the method for automated manufacturing strategy generation includes: identifying features of a desired part from a virtual model S100; and determining a tactic strategy based on the identified features S200. As shown in FIG. 2, the method can additionally include determining a toolpath primitive for each tactic S300; combining the toolpath primitives for the tactics to generate a master toolpath S400; and translating the master toolpath into machine code S500. The method can optionally include manufacturing a physical part using the machine code. The method can optionally include receiving a virtual part model and determining an order for manufacturing the part faces, wherein the part face ordering can be used in determining the master toolpath.

This method functions to generate an overall strategy to manufacture a desired part, wherein the strategy can include: the order of manufacturing processes, which machines to use, which tools to use, what path the tools should take, the tool operation parameters (e.g., spindle rate, feed rate, etc.) over the course of each toolpath, and/or any other suitable strategy parameter. The method can additionally function to optimize the manufacturing strategy for one or more manufacturing parameters, such as machine runtime, delivery time, cost, or any other suitable manufacturing parameter. For example, the method can minimize the residence time of a part within a machine, minimize the total runtime required to manufacture the part (across one or more machines), minimize the time required to manufacture the part (e.g., across one or more machines or manufacturing facilities, including inter-machine or inter-facility transfer time, etc.), or otherwise minimize the time associated with manufacturing a part.

2. Benefits and Systems.

This method can confer several benefits over conventional manufacturing strategy determination methods. First, by isolating each feature and individually generating toolpaths for each feature, the method functions to reduce the large problem of generating a master toolpath into smaller problems that can be tackled individually in a systematic manner. Second, by generating feature toolpaths based on a set of generic tactic strategies, the method can dynamically generate different feature toolpaths based on the tool or machine selected for the part. For example, the method can just as easily generate a toolpath for a 3-axis CNC mill or a toolpath for a 5-axis CNC mill for the same part, based on the same set of tactic strategies. Third, by aggregating the disparate or loosely-associated feature toolpaths into the master toolpath after the feature toolpaths have been generated, the method enables optimization of manufacturing parameters. This secondary aggregation process can additionally enable the method to dynamically accommodate for changes in machine availability, facility capability, and manufacturing demand. For example, when a waterjet cutting machine is available, the master toolpath can include roughing the part features with the waterjet cutting machine, then finishing with a milling machine. When the waterjet cutting machine is not available (e.g., is down for maintenance or is being used for other parts, such as large parts where the waterjet cutting machine can reduce a larger percentage of the machining time), the master toolpath can be dynamically adjusted to include roughing the same part features with a mill or other machine. The secondary aggregation process can additionally enable the method to select master toolpaths or master series that maximize one or more variables. For example, a first master toolpath or series (master strategy) that minimizes the number of tool changes and tool movement can be selected when a strategy optimized for manufacturing time is desired, while a second master strategy that maximizes an anticipated part pass rate can be selected when a strategy optimized for high pass rates is desired. Fourth, by generating a master strategy from disparate feature strategies that are machine-independent, this method dynamically accommodates for differences between machine types, models, and versions. This accommodation effectively removes the prior requirement for the operator to have an inherent understanding of the machine, the machine code, and how the machine is supposed to manifest the code. This also allows for probing paths to be automatically generated, since part and cut location are known.

The same method is preferably applied to generate strategies for each of a plurality of desired parts (e.g., multiple virtual models), but can alternatively be applied to generate strategies for a single desired part. The strategies for multiple desired parts can be generated concurrently (e.g., in parallel), generated serially (e.g., wherein the respective virtual models are queued and serially processed), generated in real-time (e.g., as the respective virtual models are received), or be generated in any suitable order at any suitable time. The strategies for multiple desired parts can be integrated into a single master strategy used to manufacture the multiple desired parts in the same manufacturing run (e.g., concurrently on the same plate, in the same volume, etc.), but can alternatively remain separate, such that the multiple desired parts can be manufactured in different manufacturing runs. The method is preferably applied to the virtual model in response to virtual model receipt (e.g., from the system and method disclosed in U.S. application Ser. No. 14/517,711, incorporated herein in its entirety by this reference, but alternatively received from any other suitable system in any other suitable manner), but can alternatively be applied to the virtual model after manufacturability has been verified (e.g., in the manner disclosed in U.S. application Ser. No. 14/517,734, incorporated herein in its entirety by this reference, but alternatively in any other suitable manner), after a fixture has been generated for the desired part, or be applied to the virtual model at any other suitable time. The output of the method can additionally be used in generating probe paths for confirming physical part placement, orientation, or manufacture (e.g., in the method disclosed in U.S. application Ser. No. 14/807,350, incorporated herein in its entirety by this reference, but alternatively in any other suitable method).

The method can be run once or multiple times. In the latter variation, different instances of the method can be performed and considered for the same part concurrently (e.g., in parallel), in series (e.g., wherein subsequent instances can be run when the results prior instances were unsatisfactory, run to consider all possible options), or in any other suitable order. Different instances of the method can be run with different combinations of variable values (e.g., different machining axes, different feature definitions, different feature classifications for a feature, etc.) or otherwise performed. When multiple instances are run, the method can include selecting an optimal master toolpath from the plurality of results, wherein the optimal master toolpath can be the toolpath that minimizes tool changes, minimizes tool motion, minimizes part failure, minimizes manufacturing cost, minimizes manufacturing time, maximizes a confidence metric, or be otherwise selected.

All or part of method can be automatically performed by a processing system, wherein the processing system can be a manufacturing machine, a computing system local to the manufacturing facility, a computing system remote from the computing facility (e.g., a server system), a user device, or be performed by any other suitable system. The method can be performed in response to receipt of the virtual part, when a threshold volume of virtual parts have been received, or at any other suitable time. The computing system can be a set of servers (e.g., networked servers), GPUs, CPUs, microcontrollers, or be any other suitable set of computing systems. The processing system can additionally store or access any libraries (e.g., machine code translation libraries), equations (e.g., spindle speed equations for each tool or tool type, stepover equations, etc.), rules (e.g., feature detection rules, feature dependency rules), graphs or charts (e.g., stepdown graphs), manufacturing facility information (e.g., available processes or machines, capacity, tools available, schedule, etc.), or any other suitable data used in the method.

The method is preferably used with a virtual model. The virtual model is preferably received from a user (e.g., from a CAD program, from a user account), but can alternatively be automatically generated (e.g., from a 3D scanning program), or be otherwise generated. The virtual model can include a set of analytic faces (e.g., include edges and loops; vectors; etc.), include a mesh geometry, or have any other suitable virtual representation. The method is preferably used as part of a process to automatically manufacture a physical part substantially similar to the virtual model, but can alternatively be otherwise used.

3. Automatic Computer Aided Manufacturing.

a. Identifying Features.

Identifying features from a virtual model of a virtual part S100 functions to identify regions for which individual toolpaths will be generated. Examples of features that can be identified include: surfaces (e.g., peripherals or levels), boundaries, holes, indents, chamfers, curves, fillets, ribs, bosses, domes, extrusions, or include any other suitable feature. The virtual part preferably includes a plurality of features, but can alternatively include any suitable number of features. An example of a virtual part and respective identified features is shown in FIGS. 5A and 5B, respectively.

The features (part features) can be identified from virtual model metadata (e.g., based on the feature tool used to create the virtual model, received from the CAD program), geometric analysis (e.g., surface contour analysis, vector analysis, etc.), heuristic analysis (e.g., using hint-based methods, rule-based methods, neural networks, pattern matching), volumetric analysis (e.g., differential volume analysis, convex hull analysis, decomposition, etc.), topology analysis (e.g., graph based analysis), a combination of the above, or be otherwise identified.

In one variation, the features are determined S100 based on the part faces. In one embodiment, adjacent part faces (e.g., contiguous part faces) sharing a common feature class can be grouped together into a feature. In a second embodiment, adjacent part faces satisfying a predetermined pattern or satisfying a predetermined rule can be grouped into a feature. The pattern or rule can be associated with a tool or tool type, or be otherwise defined. For example, a set of adjacent part faces cooperatively forming a T-slot that substantially matches a reference T-slot associated with an available T-slot cutter can be grouped together into a feature.

In a second variation, the features can be automatically identified using a feature identification engine. However, the features can be otherwise identified.

The method can optionally include splitting a feature into one or more features when a predetermined set of conditions are met (e.g., when the feature cannot be manufactured as a single feature, when an optimization indicates that the feature can be better manufactured as multiple features, etc.). In one variation, the method can include: determining that a feature access depth (e.g., measured from the top of an adjacent feature within a predetermined distance of the feature to the lowest feature distance) is less than a tool length or toolholder length, and subdividing the feature in response to such determination. Subdividing the feature can include: dividing the feature according to a set of predetermined rules (e.g., if a through-hole, then divide into two sub-holes that connect, wherein the two sub-holes are formed from opposing faces), dividing the feature according to a subdivision produced by a neural network, or otherwise subdividing the feature.

The method can optionally include classifying the features S110, which functions to associate each feature with a feature class. This can function to shortcut feature tactic determination, feature tool determination (e.g., determine which tool to use to manufacture the feature), feature process determination, or other feature-based determinations. This can also function to enable the process to work with features in more abstract manner by decoupling the feature from its specific geometry. Examples of feature classes that can be used include: levels (level features), peripherals (peripheral features), chamfers (chamfer features), fillets (fillet features), holes (hole features), and deburring (deburring features). However, any other suitable classes can be used.

Feature classes can be defined by geometry (e.g., slot, pocket, channel, etc.), tool type (e.g., square end mill, ball end mill, roughing end mill, tapered end mill, chamfer end mill, concave radius end mill, etc.), tool (e.g., ball end mill with first diameter, ball end mill with second diameter, etc.), process, relationship to the manufacturing axis, or otherwise classified. The feature class can be part of a static set of feature classes, a dynamic set of feature classes, or any other suitable set of feature classes. The feature classes and/or feature sets can be determined based on the tools available at a manufacturing facility, processes available at a manufacturing facility, determined by a user (e.g., manufacturing entity, user account), or otherwise determined.

Each feature class can be associated with one or more tools or tool types. The feature class can be associated with the tool type or tool through the tactics within the tactic set associated with the feature class, be directly associated with the tool or tool type, or be otherwise associated with the tool type or tool.

A part feature can be classified with one or more feature classes. When the part feature is classified with multiple part feature classes, different instances of the method can be run (e.g., concurrently, serially, etc.) for each potential part feature class. Alternatively, the part feature can be classified with the feature class having the lowest failure rate, lowest tool movement, highest probability, highest tool availability (e.g., in the manufacturing facility), or as the feature class that satisfies any other suitable set of conditions.

The features can be classified using the virtual model metadata, through geometric analysis, through a set of rules, through a neural network, through a classification module (e.g., trained on a supervised set), or otherwise classified.

In a first variation of feature classification, the feature is classified based on the tool capable of machining the feature geometry. For example, a part feature (e.g., a corner) can be classified as a first feature class associated with a tool (e.g., a radius cutter) when the part geometry (e.g., corner radius) matches the tool radius, and classified as a second feature class associated with a different tool (e.g., a ball end mill) when the part geometry matches the tool radius or does not match the first tool's radius. However, the feature can be otherwise classified.

In a second variation of feature classification, the feature inherits the classification of the part face(s) forming the feature. In this variation, the part face(s) can be classified with a feature class or otherwise associated with a feature class. In one embodiment of this first variation, identifying the features from the virtual model includes: identifying part faces of the virtual part, classifying each part face with a feature class, identifying adjacent part faces sharing a common parameter (e.g., sharing a common feature class), and grouping the identified part faces into a feature. The resultant feature can have the same feature class as the constituent part faces, have a different feature class determined based on the combination of the identified part faces, or have any other suitable feature class. However, features or feature primitives (e.g., feature components) can be otherwise classified.

Identifying part faces functions to identify feature primitives (e.g., feature components). The part faces are preferably determined before the features are identified, but can alternatively be determined afterward. The part faces can be determined from the virtual model using boundary representation methods, volume-based methods, or any other suitable method. In one example, the part face is determined using boundary representation methods, wherein a part face can be defined as a surface or region enclosed by a loop of edges. However, the part face can be otherwise defined.

Classifying each part face with a feature class (e.g., a feature class can be determined for the part face) functions to classify the feature primitives. The part face can be classified using the feature classifications discussed above, be classified based on the part face geometry (e.g., planar, concavity, etc.), be classified based on the part face orientation relative to a manufacturing axis, or be classified using any other suitable method.

In one variation, the part face can be classified based on the relationship between the part face and a manufacturing axis. For example, part faces substantially normal to the manufacturing axis can be classified as level features, part faces substantially parallel to the manufacturing axis can be classified as peripheral features, planar part faces at an angle (between normal and parallel) to the manufacturing axis can be classified as chamfered features, curved part faces can be classified as filleted features (e.g., surfaces formed by sweeping a circle along a curve; curved surfaces; concave or convex surfaces; etc.), part faces bounding cylindrical voids can be classified as hole features, and edges can be classified as deburring features. A part face can be considered to be substantially related to a reference element (e.g., substantially normal, substantially parallel) when the part feature is within a threshold unit value (e.g., angular range, distance, etc.) of the reference element. In a specific example, part faces at an angle to the manufacturing axis (face angle) can be classified with the feature class associated with a tool having a tool angle substantially matching the face angle. Features with face angles that do not match any tool angles can be rejected, adjusted to match a tool angle and recommended to the user, or otherwise managed. However, the part faces can be otherwise classified.

The method can optionally include determining a manufacturing axis, which functions to specify the tool access axis (e.g., z-axis, axis parallel the tool longitudinal or rotation axis). The manufacturing axis (e.g., machining axis, operation axis, access axis, operation direction, access direction, manufacturing direction, etc.) can be determined before, after, or during feature identification, feature classification, part face determination, or at any other suitable time. Each part can have one or more manufacturing axes, wherein the number of manufacturing axes can be based on the machine used, process used, tools to be used, or any other suitable parameter. The manufacturing axis is preferably a major axis of the part (e.g., an x-axis, y-axis, z-axis, etc.), but can alternatively be any other suitable axis. Determining the manufacturing axis can include determining the manufacturing axis from virtual model metadata (e.g., received from the CAD program), received from a user (e.g., the user account providing the virtual model), determined based on part face geometry, determined based on part feature geometry, determined based on available tool geometry, or otherwise determined. In one variation, determining the manufacturing axis includes: identifying all part faces of the virtual part, determining all access directions for each part face (determining potential accessibility directions for each part face), and identifying one or more access directions shared by every part face, wherein the manufacturing axis can be defined as the axis extending along or parallel to the identified access direction(s). The potential access directions for a face can include a vector opposing the face normal, the locus of directions parallel the face normal, or any other suitable set of directions. In one embodiment, the method includes selecting an antiparallel access direction pair that allows every face to be accessed, wherein the manufacturing axis can be parallel to the antiparallel access direction pair. If an antiparallel access direction pair cannot be found, the virtual part can be rejected, additional manufacturing axes determined (e.g., for auxiliary part flips), alternative manufacturing processes considered, or otherwise handled. However, the manufacturing axis can be otherwise determined.

Identifying adjacent part faces with the same feature class and grouping the identified part faces into a feature functions to group part faces that can be manufactured using the same tool together. The adjacent part faces can be contiguous, be separated but located within a threshold distance of each other (e.g., within a tool tolerance distance, within a tool diameter, etc.), or be otherwise related. The identified part faces can share the same feature class, sub-class, tool type, tool, or share any other suitable parameter. Grouping the part faces together into a feature can include virtually linking the part faces together, treating the part faces as a singular feature, assigning a single tactic set to the group of part features, generating a single toolpath primitive for the group of part features (e.g., generating a single series of toolpath instructions for the group of part features, wherein the toolpath instruction series cannot be subsequently reordered or modified), or otherwise treating the part faces as a single group. However, the features can be otherwise classified.

Classifying the feature S110 can additionally include determining prerequisite features for the feature wherein prerequisite features can be secondary features, that are required or helpful in the formation of the feature. The prerequisite feature can be another feature in the virtual model, or be a feature not included in the virtual model (wherein the feature can be subsequently added to the feature set). For example, when a feature is classified as a hole, a center indent (e.g., formed by a center punch) can be added as a secondary, prerequisite feature to the feature set. In another example, to create a circular indent with a flat bottom, a circular indent must be formed before the bottom can be leveled. The prerequisite feature can additionally be associated with the feature, more preferably associated as a feature that must be formed prior to feature formation. However, the prerequisite features can be otherwise determined and used.

Individual features can additionally be grouped into geometries, wherein each geometry can include one or more contiguous features. Different geometries can be separated by predefined features, such as peripheral features (e.g., features parallel to a stock face), by a user-specified divider, by tool type, or be defined in any other suitable manner. For example, the walls and bottom of an indent can be treated as a single geometry.

b. Determining a Tactic Strategy.

Determining a tactic strategy based on the identified features S200 functions to generate a set of disparate or loosely-associated tactics for each feature. In some variants, a tactic strategy is determined for each individual feature, which functions to split the computationally-intensive problem of generating a global tactic strategy into smaller, more manageable pieces. While this may result in some toolpath or code redundancies, in increased tool changes, or in unnecessary tool motion, this method can be simpler from a computational standpoint. The tactic strategy can be determined before toolpath primitive determination or generation (e.g., wherein the toolpath primitives can inherit the tactic dependencies), after toolpath primitive determination or generation (e.g., wherein the toolpath primitives can be adjusted based on and/or merged in the order specified by the tactic strategy), concurrently with toolpath primitive generation, or determined at any other suitable time.

Determining the tactic strategy S200 can include determining a set of tactics (stages) for each feature of a feature set, which functions to determine individual feature strategies for each feature. The set of tactics for each feature can include one or more tactics. The set of tactics can be an ordered series of tactics, wherein each successive tactic within an ordered series is dependent upon a preceding tactic within the ordered series. For example, an ordered series can include a roughing tactic and a finishing tactic (e.g., chamfering tactic, filleting tactic, hole making tactic, etc.), where the finishing tactic is dependent upon (e.g., must be performed after) the roughing tactic in the ordered series. Alternatively, the tactic set can be unordered or be otherwise structured. However, the tactic strategy can be otherwise structured.

A tactic (stage) can be a virtual process capable of completing (e.g., virtually manufacturing or creating) a certain class of features. The tactic can be associated with one or more feature classes. Each feature class can be associated with one or more tactics. In one variation, each feature class is associated with a different ordered series of tactics, wherein each successive tactic within the ordered series is dependent upon the preceding tactic. For example, an ordered series of tactics can include a roughing tactic, followed by one or more finishing tactics. The feature class can be defined by the finishing tactic types (e.g., a chamfering class defined its associated ordered series including a chamfer finishing tactic). However, the feature classes can be otherwise related to the tactics.

Examples of tactics include: a roughing tactic, configured to remove virtual material from a virtual representation of the part stock; a finishing tactic configured to remove material to within a threshold distance from the virtual model; a semi-roughing tactic configured to remove material to a fixed offset distance from the virtual model; a manipulation tactic configured to manipulate (e.g., rotate) a workpiece relative to a tool cutting surface; a contouring tactic configured to manipulate a tool side relative to a workpiece; a hole making tactic configured to form holes in the virtual part stock; a chamfering tactic configured to chamfer edges of the virtual part stock; a filleting tactic configured to create a fillet in the virtual part stock; a level finishing tactic configured to remove material to within a threshold distance of a plane perpendicular the machining axis; a peripheral finishing tactic configured to remove material to within a threshold distance of a plane parallel the machining axis; a deburring tactic configured to deburr part edges; or include any other suitable tactic configured to form any other suitable feature or geometry.

In one example, a limited set of tactics can be available for assignment to the features (e.g., through the feature class), wherein the tactics that can be assigned include a roughing tactic (e.g., the same for each feature class, alternatively different) and finishing tactics, wherein the finishing tactics include: a hole making tactic, a chamfering tactic, a level finishing tactic, a peripheral finishing tactic, a filleting tactic, and a deburring tactic. However, any other suitable tactic can be used. Each tactic can additionally be associated with a set of limitations, such as access limitations, prerequisite limitations, minimum material limitations, or include any other suitable set of limitations.

Each tactic can be associated with a tool type or tool, but can be associated with any other suitable parameter. In one variation, each tactic can be associated with a specific tool type. For example, the chamfering tactic is associated with a chamfering tool with a given tool angle, while a roughing tactic is associated with a roughing tool (e.g., roughing end mill).

Determining tactic strategy based on the identified features S200 can include generating, selecting, assigning (e.g., using a rule set, using a neural network, etc.), calculating, or otherwise determining the tactic set for each identified feature.

In a first variation, determining tactic strategy based on the identified features S200 includes considering the geometries for all features and generating the tactic strategy based on the aggregate geometries. In this variation, the tactic strategies are generated for the part as a whole, such that tactics do not need to be independently determined for each feature before aggregation.

In a second variation, determining tactic strategy based on the identified features S200 (e.g., determining the tactic strategy for the feature set) includes comparing the feature geometries and feature arrangement of the current feature to a historic feature, and generating a tactic strategy for the current feature by modifying the tactic strategy for the historic feature based on differences between the current feature and the historic feature. However, the tactic strategy for the feature set can be otherwise determined.

In a third variation, determining the tactic strategy for a feature S200 can include: determining whether a feature can be formed by a tactic (e.g., from a predetermined tactic set); associating the tactic with the feature and marking the feature as complete if the feature can be formed by the tactic; and marking the feature as incomplete if the feature cannot be formed by the tactic. The method can additionally include: after application of each tactic, re-applying the previously applied tactics to determine whether any of the previously inapplicable tactics are now applicable. Alternatively, the tactics can be applied, without revisiting previously applied tactics.

In a fourth variation, determining a set of tactics for a feature S200 includes: identifying the feature class for the feature (e.g., determined as discussed above), determining the tactic set associated with the feature class, and assigning the tactic set to the feature based on the feature class. An example is shown in FIG. 9.

In the fourth variation, each feature class is associated with a tactic set, more preferably an ordered series of tactics but alternatively any suitable set of tactics. The feature class-tactic set association can be predetermined, automatically assigned (e.g., by a neural net), dynamically determined, or otherwise determined. Each feature class is preferably associated with a different tactic set, but different feature classes can share a tactic set. The tactic sets for each class are preferably predetermined (e.g., heuristically, empirically, received from a user, etc.), but can alternatively be dynamically determined or otherwise determined. The feature class can be defined by one or more of the tactics within its associated tactic set, but can be otherwise defined. For example, a level feature can be associated with a roughing tactic and a level finishing tactic, a peripheral feature can be associated with a roughing tactic and a peripheral finishing tactic; a hole feature can be associated with a roughing tactic and a hole making tactic; a chamfering feature can be associated with a roughing tactic and a chamfering tactic; a filleting feature can be associated with a roughing tactic and a filleting tactic; and a deburring feature (e.g., an edge, an available edge, etc.) can be associated with a deburring tactic. However, each feature can be associated with any other suitable tactic set.

However, determining a tactic strategy for each feature S200 can include: applying every combination of tactics (e.g., every possible tactic series) to a virtual model of a feature precursor until a tactic combination is found that virtually creates the feature; feeding the feature through a neural network, wherein the neural network generates a tactic series; calculating the probability of success for each possible tactic or series thereof in generating the desired feature, and selecting the tactic or series having the highest probability; or otherwise determining the tactic strategy for a feature.

c. Generating a Master Series.

Figure 3:
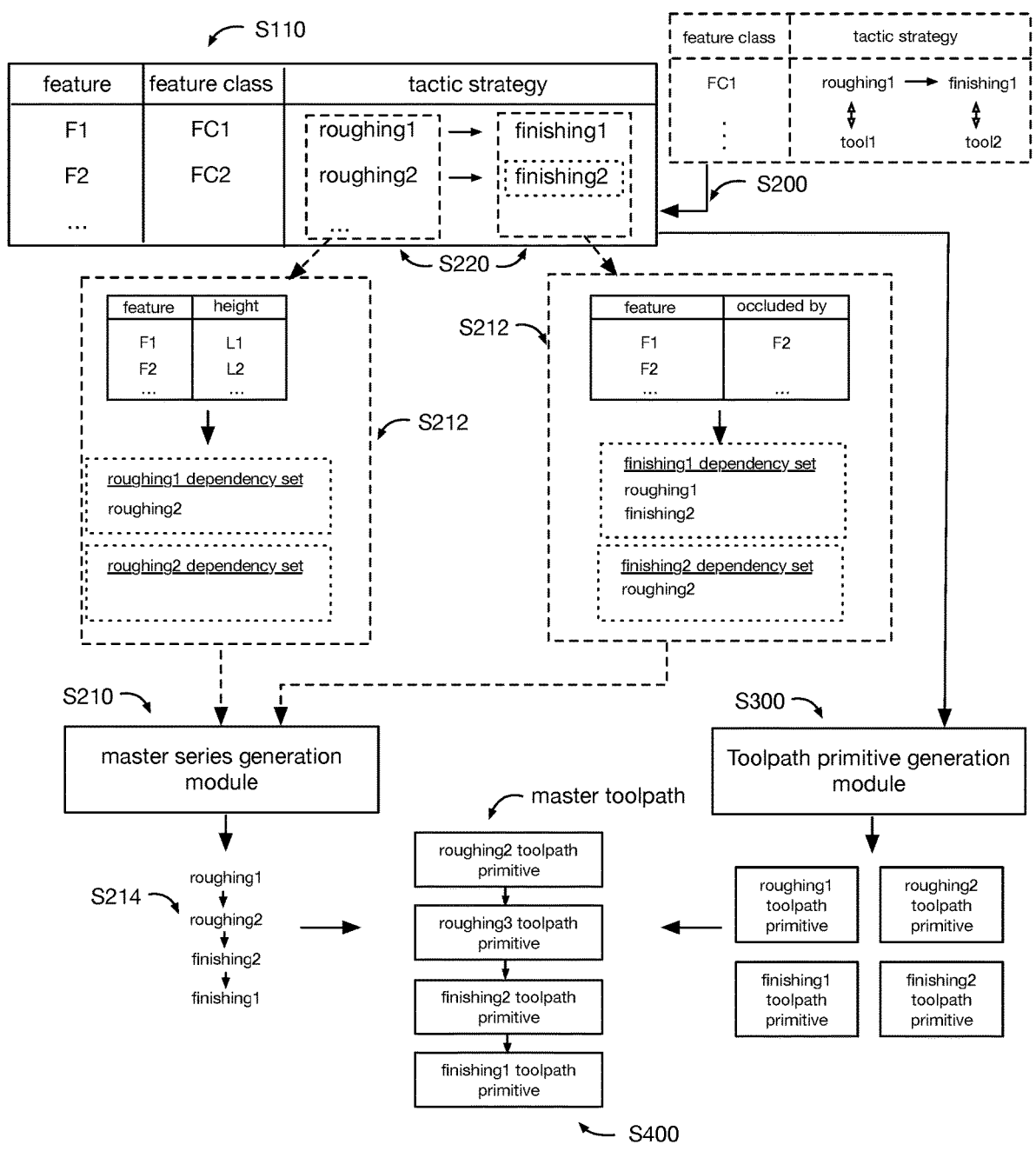
FIG. 3 is a schematic representation of an example of the method for generating a master toolpath for a virtual part.
Figure 4:
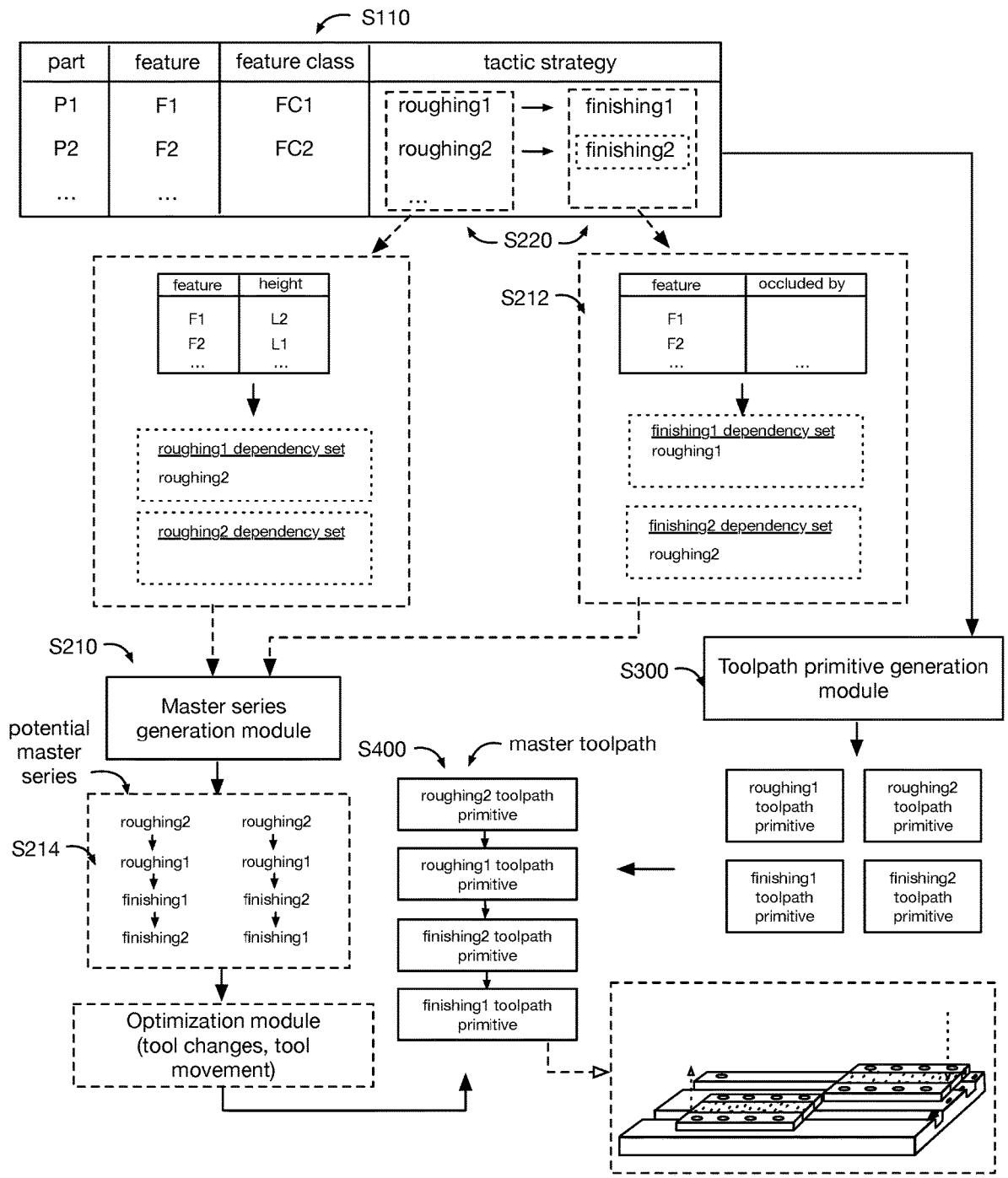
FIG. 4 is a schematic representation of an example of the method for generating a master toolpath for multiple virtual parts.

The method can optionally include aggregating tactic strategies for individual features together into a master series S210, which functions to generate the tactic strategy (the master series, the master tactic strategy) for the part, examples shown in FIG. 2, FIG. 3, and FIG. 4. One or more master series can be generated for a virtual part. Tactic strategy aggregation can be performed once, iteratively, or any suitable number of times to generate the master series. In a first variation, a single master series is generated for the virtual part, wherein tactic strategies for all virtual part features are aggregated into the master series (e.g., wherein the feature set includes all features). In a second variation, two tactic strategies are generated for the virtual part (e.g., for a 3-axis machine), one for each machining direction, wherein tactic strategies for all features accessible from a common machining direction are aggregated together (e.g., wherein the feature set includes features sharing a common accessibility direction). However, any suitable number of master series can be generated for any suitable feature set, wherein the number of master series can be determined based on: the process type, the machine type or capabilities (e.g., 3-axis, 5-axis, etc.), the number of part flips, whether a work holding system can be made for the part intermediaries, a work holding confidence score, or any other suitable variable.

The individual features for which the tactic strategies are aggregated can be from a single virtual part, from a single part face (e.g., accessible from a single machining direction), from multiple virtual parts (example shown in FIG. 4), or for any suitable set of features. When the individual features are from multiple virtual parts, the method can additionally include selecting a plurality of virtual parts for concurrent manufacture (e.g., manufacture in the same run, in the same machining volume, etc.). The virtual part plurality can include different instances of the same virtual part, different virtual parts (e.g., received from the same or different user accounts), or any other suitable virtual part. The plurality of virtual parts can be selected through optimization for one or more variables (e.g., cost, machining time, etc.), shared processes (e.g., all must be milled), or otherwise selected. The resultant master strategy preferably includes at least one tactic for a feature of a first virtual part immediately dependent upon or preceding a tactic for a feature of a second virtual part. More preferably, the master strategy includes the first virtual part master strategy interspersed with tactics for a second virtual part. In one example, the master strategy can include a roughing tactic for a feature of the first virtual part immediately preceding a roughing tactic for a feature of the second virtual part, wherein a finishing tactic for the feature of the first virtual part is after the roughing tactic for the second virtual part feature. However, the virtual part tactics can be otherwise ordered.

In a first variation, aggregating the individual tactic series together S210 includes: determining dependencies for each tactic S212 and ordering the tactics from all features of the set into a master series while preserving the tactic dependencies S214.

Determining dependencies for each tactic S212 (e.g., determining the dependency set for a tactic, determining the tactic dependencies, determining the inter-tactic dependencies etc.) functions to determine the tactics that must be performed before and/or after a given tactic is performed (e.g., generate a tactic dependency tree). Each tactic can be associated with a dependency set. The dependency set can include only preceding tactics, wherein performance of the tactic can be dependent upon prior performance of prior tactics in the dependency set; only succeeding tactics, wherein the tactic must be performed before the succeeding tactics within the dependency set; a mix of preceding and succeeding tactics, or any other suitable set of tactics. The dependency set for a tactic can be an empty set, or include any suitable number of tactic dependencies.

The tactic dependencies can be determined in a variety of ways, and the determination methods can be applied globally (e.g., to all features), to a tactic group (e.g., to a roughing group, to a finishing group, to a finishing subgroup, etc.), or to any other suitable set of tactics.

In a first variation, determining the tactic dependencies S212 includes, for each tactic within an ordered series of tactics, creating a dependency between each successive tactic on the preceding tactic(s) in the ordered series. For example, when a filleting tactic includes a fillet roughing tactic and a fillet finishing tactic, a dependency can be created for the fillet finishing tactic on the fillet roughing tactic. Alternatively, the tactic dependencies can be determined according to a set of tactic dependency rules, example shown in FIG. 6.

In a second variation, determining the tactic dependencies S212 includes creating tactic dependencies based on feature height (e.g., assigning dependencies to the roughing tactics according to a height order of the respective part features), example shown in FIG. 3. In this variation, tactics associated with lower features are preferably dependent upon tactics associated with higher features, but any other suitable set of dependencies can be created. The feature height is preferably relative to the heights of other features, but can alternately be absolute or otherwise determined. The feature height is preferably determined along the machining axis, but can alternatively be determined along any other suitable axis. The feature height can be measured from the tallest region of the feature, from the tallest region of the feature that is normal the machining axis (e.g., inclusive or exclusive of edges), or from any other suitable portion of the feature. The tallest region of the feature can be the feature region most distal from a separation plane, most proximal the tool, or otherwise defined. Alternatively, the feature height can be determined by: segmenting the virtual part into a plurality of planes perpendicular to the machining axis and associating a height with each plane, wherein the height decreases with distance along the machining direction. The feature height can be the height associated with the first plane that the feature intersects along the machining direction. Alternatively, the feature height can be determined from virtual model metadata or otherwise determined.

In a third variation, determining the tactic dependencies S212 includes creating tactic dependencies based on inter-feature interactions.

In a first embodiment of the third variation, creating tactic dependencies based on inter-feature interactions includes: determining that an inter-feature relationship matches a predetermined relationship, identifying the tactics associated with each feature in the inter-feature set, identifying the rule associated with the inter-feature relationship, and assigning tactic dependencies according to the rule. The rules can be heuristically determined, user-specified, or otherwise determined. The tactic dependencies preferably mimic the inter-feature dependencies (e.g., the dependencies are inherited from the inter-feature interactions), but can be different or otherwise related to the inter-feature dependencies. For example, the rule set can specify that the all tactics for a hole on a chamfered face (e.g., hole roughing, hole finishing) must be dependent upon the finishing tactic of the chamfered face, example shown in FIG. 7. In another example, the rule set can specify that all deburring occurs after all other tactic types. The rule set can additionally which tactics of the features (e.g., roughing, finishing, etc.) must be dependent upon another. For example, the rule set can specify that, for a hole contiguous and concentric with a chamfered ring (e.g., a countersunk hole), the chamfer roughing tactic is dependent upon the hole roughing tactic, example shown in FIG. 8.

In a second embodiment of the third variation, creating tactic dependencies based on inter-feature interactions includes predicting feature occlusions and creating a dependency of the occluded feature on the occluding feature, example shown in FIG. 3. Predicting feature occlusions can include: projecting each part feature along the machining axis (e.g., against the machining direction), identifying an adjacent part feature occluded by the projection. A feature can be occluded by the projection when the projection intersects the feature, extends over the feature along the machining direction, or otherwise prevents tool access to the feature. However, potential feature occlusions can be otherwise determined, and dependencies otherwise created.

In a fourth variation, determining the tactic dependencies S212 includes determining the tactic dependencies based on tool volume interactions. This variant can be performed after a preliminary master series is generated, wherein the method can include iterating through multiple master series variants until conflicts are resolved. In this variation, the method can include: generating a virtual model of the part intermediary (e.g., a model of the roughed part); sweeping a tool volume along an anticipated toolpath of a tactic in master series, wherein the tactic is associated with a first feature; identifying a tool volume interaction with the virtual part intermediary (collision volume); identifying secondary feature(s) associated with the interaction regions; identifying a secondary tactic for the secondary feature(s) that would remove the collision volume; and creating a dependency of the tactic on the secondary tactic. However, tool collision volumes can be otherwise managed.

However, the dependency set for each tactic can be otherwise determined.

The tactic dependencies can be determined individually (e.g., for each tactic), as a group, or in any other suitable manner.

In a first variation, the tactic dependencies are determined based on the dependencies of the underlying features, wherein the tactics associated with each feature inherit the dependencies of the feature. For example, when a lower feature is dependent upon a higher feature (e.g., wherein the dependencies are assigned in a top-down manner), tactics for a lower feature can be dependent upon the tactics for the higher feature.

In a second variation, the tactic dependencies can be determined based on tactic class. This variation can allow inter-tactic dependencies to be determined independent of universal feature analysis. This variation can result in a tactic strategy that aggregates similar tactics (and consequently, toolpaths requiring the same or similar tools) together, which can minimize tool changes. For example, this variation can result in a tactic strategy in which all features (accessible from a first machining direction) are roughed together, then individually finished using the respective tool. This variation also confers some flexibility in the resultant tactic strategy. For example, if a first feature cannot be roughed before an adjacent feature is finished (e.g., due to tool volume interactions), this variation can identify the dependency and chain the first feature roughing tactic after the adjacent feature's finishing tactic.

The second variation of tactic dependency determination can include: grouping tactics across the plurality of features into a set of tactic groups S220 and determining inter-feature tactic dependencies within each tactic group, wherein the master tactic series preserves the inter-feature tactic dependencies.

Grouping the tactics S220 functions to generate subsets of tactics for dependency determination. The tactics considered are preferably those in the tactic sets associated with each feature of the plurality, but can alternatively be a subset of those tactics. For example, all tactics associated with the plurality of features are considered. The tactics can be grouped by tactic class (e.g., roughing, finishing), by tactic (e.g., roughing, fillet finishing, chamfer finishing, level finishing, peripheral finishing, hole making, deburring, etc.), by tool type associated with the tactic, by tool associated with the tactic (e.g., first chamfering tool, second chamfering tool, etc.), by access direction, or otherwise grouped. For example, the method can include grouping the tactics across all features in the set by tactic class into tactic groups. This can include grouping all roughing tactics (from each ordered series) into a roughing group, and grouping all finishing tactics (from each ordered series) into a finishing group. Each finishing tactic within the finishing group is still dependent upon its respective roughing tactic in the roughing group, based on the dependency from the ordered tactic series associated with the feature.

Determining inter-feature tactic dependencies within each group functions to determine auxiliary dependencies between the tactics in the group. The auxiliary dependencies are preferably added to the dependency set associated with the tactic, but can be otherwise recorded. Different groups can use the same or different inter-feature dependency determination methods, discussed above. One or more inter-feature dependency determination methods can be applied to each group. In a first example, determining inter-feature tactic dependencies within the group includes: determining inter-feature dependencies (e.g., determining which feature must be machined before another), and assigning the inter-tactic dependencies within a group according to the inter-feature dependencies. In a second example, determining inter-feature tactic dependencies within the group includes creating dependencies according to the relative heights of the respective features, such that tactics associated with lower features are dependent upon tactics associated with higher features within the group. In a third example, determining inter-feature tactic dependencies within the group includes: assigning dependencies according to the inter-feature interactions. However, the inter-tactic dependencies within each group can be otherwise determined.

In one specific example, the method includes: grouping the tactics, from all the ordered tactic series associated with a feature, by class into a roughing group and a finishing group. Dependencies for the roughing tactics within the roughing group are assigned according to the relative heights of the respective features, wherein roughing tactics associated with lower roughing features are dependent upon roughing tactics associated with higher roughing features. Dependencies for the finishing tactics within the finishing group are assigned according to inter-feature interactions (e.g., based on rule sets associated with predetermined inter-feature interaction patterns, based on predicted feature occlusion, etc.). As such, the finishing tactics within the finishing group are dependent upon roughing tactic in the ordered series (from which the finishing tactic was extracted) and primitives of features that must be done before this feature can be made, based on part topology. However, the dependencies can be otherwise generated.

Ordering the tactics from all part features of the plurality into a master series S214 while preserving the tactic dependencies functions to generate the master series. The master series can be a series of tactics that, when translated into machine code, could manufacture a physical analog of the virtual part, or be otherwise defined. Ordering the tactics functions to generate one or more master series (e.g., tactic evaluation order), where tactics are linked according to dependency. All tactics from all features are preferably linked within the master series; alternatively, the tree can include some unattached branches. The master series is preferably a linear list, but can alternatively be a branched tree or have any other suitable structure. Ordering the tactics can include applying a sorting method to the tactic dependency tree or dependency graph resulting from tactic dependency determination, or otherwise ordering the tactics to preserve each tactic's dependencies. The sorting method can include: a topological sort (e.g., Khan's algorithm, depth-first search, etc.), or any other suitable sorting method.

The method can optionally include inserting part flip instructions, tool change instructions, fixturing instructions, or any other suitable set of instructions between consecutive tactics or master strategies. In one example, a part master strategy for the part can include a first master strategy for a first part face appended to a second master strategy for a second part face, wherein the part master strategy can include a part flipping instruction and first part face fixturing instructions between the first and second master strategies.

The method can optionally include performing cycle detection to the tactic dependency graph prior to sorting application to detect any circular dependencies (cycles). In response to cycle detection, the method can: reject the virtual part, consider a different process or combination thereof for part manufacture, consider a different set of manufacturing directions, consider a different set of tactics for the part (e.g., treating a fillet as a set of stepped levels instead of a fillet, etc.), or otherwise adjust the analysis.

Ordering the tactics into a master series S214 can generate multiple potential master series. This can occur when the features are so loosely related that the part can be made through multiple different strategies (e.g., when the finishing order for a first and second feature are interchangeable). When this happens, the method can include selecting a potential master series for use in manufacture, as shown in FIG. 2. The potential master series can be selected based on the respective score (e.g., manufacturability score, work holding interaction score, work holding confidence score, etc.), based on an optimization (e.g., to optimize for a set of manufacturing parameters, such as tool changes, tool motion, manufacturing time, cost, etc.), based on whether a toolpath can be generated from the respective master series, based on the probability of part failure or reliability (e.g., determined using a score, neural network, or other method; wherein the master series with the highest reliability can be selected), or otherwise selected. A master toolpath can be selected using similar methods when toolpath primitives are ordered instead of the tactics.

In a first variation, selecting a potential master series for use in manufacture includes: generating a toolpath from each potential master series, determining a number of tool changes, determining a measure of tool motion (e.g., total distance travelled for a given tool), selecting a toolpath that optimizes for (e.g., minimizes) the number of tool changes and tool motion. In a second variation, selecting a potential master series for use in manufacture includes: attempting to generate a toolpath from each potential master series, and selecting the master series for which a toolpath can be generated. In a third variation, selecting a potential master series for use in manufacture includes: running a virtual simulation for each potential master series, scoring each master series based on the respective virtual simulation (e.g., based on resultant part stress, work holding confidence, number of interferences, tolerances required, etc.), and selecting the master series with the optimal score (e.g., highest score, etc.). However, the master series can be otherwise selected.

However, individual tactic series can be otherwise aggregated into the master series.

d. Determining Toolpath Primitives for Each Tactic.

Determining a toolpath primitive for each tactic S300 functions to generate a set of toolpaths that, when implemented, cooperatively accomplishes (e.g., performs) the associated tactic. The toolpath primitive for each tactic can be determined before, after, or concurrently with: tactic set determination for each feature, master series determination, or at any other suitable time.

A toolpath primitive preferably includes a block of toolpaths, more preferably an ordered series of toolpaths, but can alternatively include any suitable set of toolpaths. The toolpaths within the toolpath primitive and/or specific parameters thereof are preferably immutable, but can alternatively be changed. For example, the toolpaths within each toolpath primitive preferably cannot be reordered, even when the order of the toolpath primitive is changed (e.g., when the associated tactic is reordered within the master series). The toolpaths can be directional (e.g., vectors), directionless, or have any other suitable set of parameters. Each toolpath within the block is preferably represented by a set of numerical control instructions (e.g., numerical control code), but can be otherwise represented.

Each toolpath preferably specifies the relative motion between a cutting edge of a tool (or material addition spindle of the tool) and the workpiece, such that the toolpath can be subsequently translated into tool motion or workpiece motion. For example, a roughing tactic can be associated with a set of linear toolpaths (e.g., boustrophedonic toolpaths, parallel toolpaths, etc.), and a hole-making tactic can be associated with a rotation direction and an entry path. However, the toolpath can be dynamically generated based on the feature parameters (e.g., orientation, shape, size, etc.) and the associated tactic, or be otherwise determined. Each tactic can be associated with a single tool, a class of tools (e.g., a set of tools), a set of tools sharing a common property (e.g., common geometry, such as shape, diameter, angle, or length; common tool type, such as flat end mill, ball end mill, drill, radius cutter, chamfer tool; etc.), or be associated with any other suitable set of tools. For example, the chamfer tactic can be associated with both a chamfer tool (e.g., chamfer cutter) and a countersink cutter. The features, capabilities, limitations, and/or toolpaths associated with each tactic can be determined independent of the tools, can be the features, capabilities, limitations, and/or toolpaths of the tools associated with the tactic, be received from a user, be empirically learned, or be determined in any other suitable manner.

Determining the toolpath primitive for each tactic S300 can include generating the toolpath primitive based on a set of tactic variables, selecting the toolpath primitive for the tactic (e.g., from a library), assigning the toolpath primitive for the tactic (e.g., using a rule set, using a neural network, etc.), filling out a toolpath primitive template (e.g., with tactic variable values), calculating the toolpath primitive for the tactic, determining the toolpath primitive using a toolpath primitive algorithm (e.g., trained neural network or other algorithm), or otherwise determining the tactic set for each identified feature.

The toolpath primitive can be determined for a given tactic based on: the feature geometry (e.g., radius, height, volume, concavity, tolerance, etc.), the machining direction, the tool associated with the tactic, the manufacturing process for the feature or part, the machine assigned to the part, the tactic dependency set, the cutting parameters associated with the feature or tactic, or based on any other suitable tactic variable. Alternatively or additionally, the toolpath primitives can be a set of toolpaths associated with one or more of the aforementioned tactic variables.

Cutting parameters associated with the feature or tactic can include feed rate, spindle speed, step over, step down, ramp angle, or any other suitable cutting parameter. The cutting parameter can be predetermined (e.g., a constant for the tool, tactic, etc.), selected from a library or lookup table, read of a chart or graph, calculated (e.g., based on other tactic parameters), determined using a neural network, or otherwise determined. The cutting parameter can be determined based on the tool, tool geometry (e.g., tool diameter), the feature geometry, the target chipload, the target surface speed, or otherwise determined. Target parameters (e.g., chipload, surface speed, etc.) can be determined based on feature geometry, part material, tool, tool type, be a constant, any other suitable tactic variable, or otherwise determined. In a first variation, the cutting parameter is a constant. In a second variation, the cutting parameter is calculated from an equation, wherein the tool or tool type associated with the tactic dictates the equation used (e.g., wherein different equations are used to determine the cutting parameters for different tools). However, the cutting parameters can be otherwise determined.

When the toolpath primitive is dependent upon variables external the virtual part (e.g., manufacturing process, machine, etc.), the external variables are preferably determined prior to toolpath primitive determination, but can alternatively be selected after. The machines or processes can be selected by optimizing the run time (e.g., minimizing the run time) for the part, fixture plate (including one or more parts), or population of parts to be made; optimizing the manufacturing cost for the part, fixture plate, or population of parts to be made; or be otherwise selected. For example, a waterjet cutter can be selected to rough the profile of a plurality of small parts when there are no parts over a threshold size to be made, and a mill can be selected to rough the profiles of the small parts when there are large parts to be made (e.g., wherein the waterjet cutter is selected for roughing the large parts). A toolpath for a waterjet cutter can be generated based on the roughing tactic associated with the small part sidewalls in the former example, and a toolpath for a mill can be generated based on the roughing tactic associated with the small part sidewalls in the latter example.

In a first variation, determining a toolpath primitive for each tactic S300 includes calculating the toolpath primitive based on the feature geometry and/or other tactic variables. In this variation, each tactic can be associated with a different equation that is used to calculate the toolpath primitive.

In a second variation, determining a toolpath primitive for each tactic S300 includes retrieving a toolpath primitive template based on the tactic (e.g., tactic class) from a toolpath library, and filling in variables using the feature geometry and/or other tactic variables. In this variation, each tactic can be associated with a different toolpath primitive template that is used to determine the toolpath primitive.

In a third variation, determining a toolpath primitive for each tactic S300 includes feeding the feature geometry and tactic into a toolpath generation engine, and using the resultant toolpath as the toolpath primitive for the tactic. Examples of toolpath generation engines that can be used include the ModuleWorks toolpath generation engine, or any other suitable toolpath generation module.

In a fourth variation, determining a toolpath primitive for each tactic S300 includes feeding the feature geometry into a toolpath generation engine, classifying each toolpath from the resultant toolpath set as a tactic of the tactic set associated with the feature, and using the toolpaths associated with each tactic as the toolpath primitive for the tactic.

In a fifth variation, determining a toolpath primitive for each tactic S300 includes selecting a predetermined toolpath block from a toolpath library or catalog based on the feature geometry, tactic class, and/or machining direction.

However, the toolpath primitive can be otherwise determined for each tactic.

e. Generating a Master Toolpath.

Combining the toolpath primitives for the tactics to generate a master toolpath S400 functions to combine disparate toolpath primitives into a master toolpath (master toolpath strategy) that could be used to manufacture a physical analog of the virtual part. Combining the toolpath primitives preferably includes ordering the toolpath primitives, wherein each toolpath primitive is treated as a cohesive, ordered block. However, combining the toolpath primitives can alternatively include reordering the toolpaths within the toolpath primitive, changing the toolpaths (e.g., the toolpath variables, toolpath type, etc.) within the toolpath primitive (e.g., to connect the toolpath primitive to a preceding or succeeding toolpath primitive), or otherwise changing the toolpath primitive during toolpath primitive combination. The toolpath primitives can be combined after tactic dependency determination, after master series determination, without master series determination, or at any other suitable time. Combining multiple toolpaths can additionally include inserting tool or machine change instructions between toolpaths corresponding to different tactic classes, sub-classes, or tools.

In a first variation, the toolpath primitives are combined S400 based on the master series (master tactic strategy, master tactic series). In this variation, the toolpath primitives can be combined after the master series is generated. In a first embodiment, the tactics within the master series are replaced by the associated toolpath primitive. In a second embodiment, each toolpath primitive inherits a relative position within the series from the associated tactic, wherein the toolpath primitive position is the respective tactic's position within the master series. However, the toolpath primitives can be otherwise combined based on the master series.

In a second variation, the toolpath primitives are combined S400 based on the respective tactic's dependency set. This variation can be performed without master series determination. In this variation, each toolpath primitive can inherit the respective tactic's dependency set, wherein the method can order the toolpath primitives (e.g., instead of the tactics, discussed above) based on the dependency set to generate the ordered series of toolpath primitives (master toolpath).

In a third variation, combining multiple toolpath primitives S400 can include determining an optimal toolpath that satisfies all toolpath requirements, for the given tool, for the face. For example, the optimal toolpath can be the toolpath that minimizes the tool movement between cuts and minimizes tool changes. However, the toolpath primitives can be otherwise combined.

f. Translating the Master Toolpath into Machine Code.

Translating the master toolpath into machine code S500 functions to generate machine-readable instructions (e.g., G-code), such that a manufacturing machine can execute all or a portion of the master toolpath strategy. The translation is preferably automatically performed (e.g., by the computing system), but can alternatively be manually performed or be otherwise performed. The translation is preferably based on code parameters for a specific machine previously selected for part face manufacture, but can alternatively be based on code parameters for a machine type, make, model, tool, or be based on any other suitable machine parameter. The code parameters can include machine capability limits (e.g., maximum feed rate, maximum spindle rate, ideal feed rate to spindle rate ratio, etc.), machine variable precision (e.g., number of digits permitted per machine variable), or include any other suitable parameter. Translating the master toolpath strategy into machine code can additionally include determining code parameters that optimize one or more machining parameters (e.g., time, cost, etc.).

The master toolpath strategy can be translated into machine code by: matching machine code expressions to the toolpaths in the master toolpath strategy (e.g., using a machine code database associating toolpaths with machine code expressions); calculating code parameter values based on the toolpaths (e.g., feed rates, spindle rates, distances, turn radii, dependency set, etc.); or otherwise converting the master toolpath strategy into machine code (example shown in FIG. 10). In one example, the method can include: identifying a machine code library for a given machine assigned to the virtual part (e.g., specific machine, machine type, machine manufacturer), wherein the machine code library includes machine code expressions for each toolpath, numeric control instruction, numeric control code, or other toolpath expression; and replacing each toolpath (within the series of toolpath primitives) with the machine code expression corresponding to said toolpath. However, the translation can be otherwise performed.

One or more machine code blocks can be generated from a single master toolpath strategy. In one variation, different machine code blocks are generated for different portions of the master toolpath strategy when the different portions are performed by different machines. For example, a first portion of the master toolpath strategy can be translated into a first code block for a 3-axis CNC mill, while a second portion of the master toolpath strategy (separate and distinct from the first portion) can be translated into a second code block for a 5-axis CNC mill. In a second variation, multiple machine code blocks can be generated for the same portion of the master toolpath strategy (e.g., such that redundant code blocks are generated), wherein each machine code block can be for a different machine of similar capability. For example, a first and second machine code block can be generated for the same portion of the master toolpath strategy, wherein the first and second machine code blocks correspond to a first and second 3-axis CNC mill of different makes, models, and/or versions.

Generating the machine code can additionally include inserting system initialization code into the machine code blocks, generating probe paths based on the toolpaths (e.g., to verify the features formed by the toolpaths), inserting the probe paths into the machine code block (e.g., before or after the machine code corresponding to the toolpaths), or transforming the machine code block in any other suitable manner.

g. Manufacturing a Physical Part.

Manufacturing a physical part using the machine code functions to manufacture a physical analog of the virtual part (e.g., manufacture a physical part substantially corresponding to the virtual part). Manufacturing a physical part using the machine code can include providing the machine code to the machine (e.g., controlling the machine according to the machine code), wherein the machine subsequently executes the machine code to manufacture the physical part. However, the physical part can be otherwise manufactured.

h. Validating the Master Toolpath.

The method can optionally include validating the master toolpath based on the virtual model, which functions to verify that the master toolpath will manufacture the desired part. The validation can be performed using the master toolpath, the machine code generated based on the master toolpath, or be validated using any other suitable set of machining instructions. Validating the master toolpath preferably includes virtually simulating the effects of performing the master toolpath on a virtual billet (part stock), and comparing the virtually manufactured part with the virtual model of the desired part. The master toolpath can be validated when the dimensions of the virtually manufactured part are within a threshold tolerance of the virtual model dimensions, wherein the threshold tolerance can be specified by the user, be default tolerance levels, or be otherwise specified. When the virtually manufactured part is outside of the tolerance threshold of the virtual model, a notification can be generated and sent to a user. Alternatively or additionally, a second master toolpath can be generated when the virtually manufactured part does not substantially match the virtual model.

i. Selecting Parts for Concurrent Manufacture.

The method can additionally include selecting a set of parts to include on a common fixture plate from a plurality of parts, which functions to determine the virtual parts within the virtual part plurality. The method can include: receiving a plurality of virtual parts (from a single user account or a plurality of user accounts), and selecting the set of virtual parts from the plurality of virtual parts. The set can be selected by optimization (e.g., to minimize cost, minimize machining time, etc.), based on shared parameters, or otherwise selected. The set of parts can be parts that share similar tactics, share similar tactics in similar order, share similar toolpaths, share similar tools, share similar machines, share similar finishing times, or have any other suitable common variable. Alternatively, the parts can use different tactics, machines, tools, or any other suitable variable. Alternatively or additionally, the parts can be selected to optimize a manufacturing parameter (e.g., run time, cost, etc.). However, the parts can be otherwise selected. The parts for the fixture plate can be selected before toolpath generation (e.g., wherein the master toolpath can be generated after virtual part arrangement on the fixture plate, as shown in FIG. 11), after toolpath generation, or be selected at any other suitable time. The parts can be selected before toolpath translation into machine code, after toolpath translation into machine code, or be selected at any other suitable time.

Selecting the parts for the fixture plate can additionally include: virtually arranging the parts on the fixture plate, and translating the toolpath coordinates for each part according to the virtual position of the part on the fixture plate, such that the toolpath coordinates are all relative to a fixture plate reference point or machine reference point. Toolpaths for the same machine and tool are preferably combined (e.g., linked) across multiple parts, based on the respective part location relative to the reference point, but can be otherwise related. The machine code can be generated based on the combined toolpaths, generated based on the individual part toolpaths then adjusted after part placement, or be generated in any other suitable manner.

An alternative embodiment preferably implements the above methods in a computer-readable medium storing computer-readable instructions. The instructions are preferably executed by computer-executable components preferably integrated with a tactic determination system. The tactic determination system can include a feature identification system and a feature completion system configured to associate each feature with tactics capable of manufacturing the feature. The tactic determination system can additionally include a toolpath determination system configured to determine a toolpath, relative to a part reference point, based on the tactics associated with the part features. The tactic determination system can additionally be utilized with an optimization system, wherein the optimization system can include a fixture plate system configured to select parts to include on a fixture plate from a plurality of parts; a machine selection system configured to select the machine to use in manufacturing the plurality of parts (e.g., based on the part tactics and/or toolpaths); and a translation system, configured to convert the part toolpaths into fixture plate toolpaths (e.g., relative to a fixture plate reference point) and to convert the part toolpaths into machine-readable code. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A method, comprising:
   receiving a first virtual part from a user account, the first virtual part comprising a first plurality of part features;
   selecting the first virtual part and a second virtual part for a manufacturing job;
   determining a relative arrangement of the first virtual part with respect to the second virtual part;
   classifying each part feature of the first plurality with a feature class from a predetermined set of feature classes, wherein each feature class is associated with an ordered series of tactics, wherein each successive tactic within an ordered series is dependent upon a preceding tactic within the ordered series;
   grouping the tactics across different features into tactic groups;
   determining inter-feature tactic dependencies within each tactic group;
   sorting the tactics into a master series while preserving the tactic dependencies;
   determining a toolpath primitive for each tactic based on the geometry of the respective part feature;
   combining the toolpath primitives for the tactics based on the master series and the relative arrangement to generate a master toolpath;
   automatically translating the master toolpath into machine code; and
   providing the machine code to a machine, wherein the machine executes the manufacturing job for a first physical part and a second physical part according to the machine code, wherein:
   the first physical part corresponds to the first virtual part;
   the second physical part corresponds to the second virtual part;
   during manufacturing, the first physical part is arranged in the relative arrangement with respect to the second physical part; and
   after manufacturing, the first physical part is physically distinct and separate from the second physical part.

2. The method of claim 1, further comprising receiving the second virtual part from a different user account, the second virtual part comprising a second plurality of part features, wherein the master toolpath comprises a first toolpath primitive for a feature of the virtual part immediately preceding a second toolpath primitive for a feature of the second virtual part.

3. The method of claim 1, wherein the second virtual part comprises a second plurality of part features, and wherein the master toolpath comprises:
   a first toolpath primitive for a part feature of the first plurality;
   a second toolpath primitive for a part feature of the second plurality, immediately following the first toolpath primitive; and
   a third toolpath primitive for the part feature of the first plurality, following the second toolpath primitive.

4. The method of claim 1, further comprising:
   determining the first plurality of part features of the first virtual part; and
   concurrently with determining the first plurality of part features, determining a second plurality of part features of the second virtual part.

5. The method of claim 1, wherein each feature class is associated with a tool, wherein determining the feature class for the part feature comprises:
   determining a machining axis for the virtual part;
   determining a part face forming the part feature;
   determining an angle of the part face relative to the machining axis; and
   classifying the part feature with the feature class associated with a tool having a tool angle matching the angle.

6. The method of claim 1, wherein each tactic is associated with a tactic class, wherein grouping the tactics comprises grouping the tactics based on the respective tactic class.

7. The method of claim 6, wherein the tactic classes comprise roughing tactics and finishing tactics, wherein grouping the tactics into a set of tactic groups comprises grouping the roughing tactics from each ordered series of tactics into a roughing group, and grouping the finishing tactics from each ordered series of tactics into a finishing group.

8. The method of claim 1, wherein the tactic groups comprise a finishing group, wherein each part feature comprises a height along a machining axis, wherein determining inter-feature tactic dependencies within the finishing group comprises, for each part feature:

projecting the part feature along the machining axis;

identifying an adjacent part feature occluded by the projection; and creating a dependency between an adjacent finishing tactic, associated with the adjacent part feature, on a finishing tactic associated with the part feature.

9. The method of claim 1, wherein the second physical part comprises a work-holding fixture.

10. The method of claim 1, wherein the second physical part is manufactured concurrently with the first physical part.

\* \* \* \* \*